Feb. 13, 1940.  L. BRANDT  2,190,251
CABBAGE MILLER TRAP
Filed Jan. 13, 1939  3 Sheets-Sheet 1
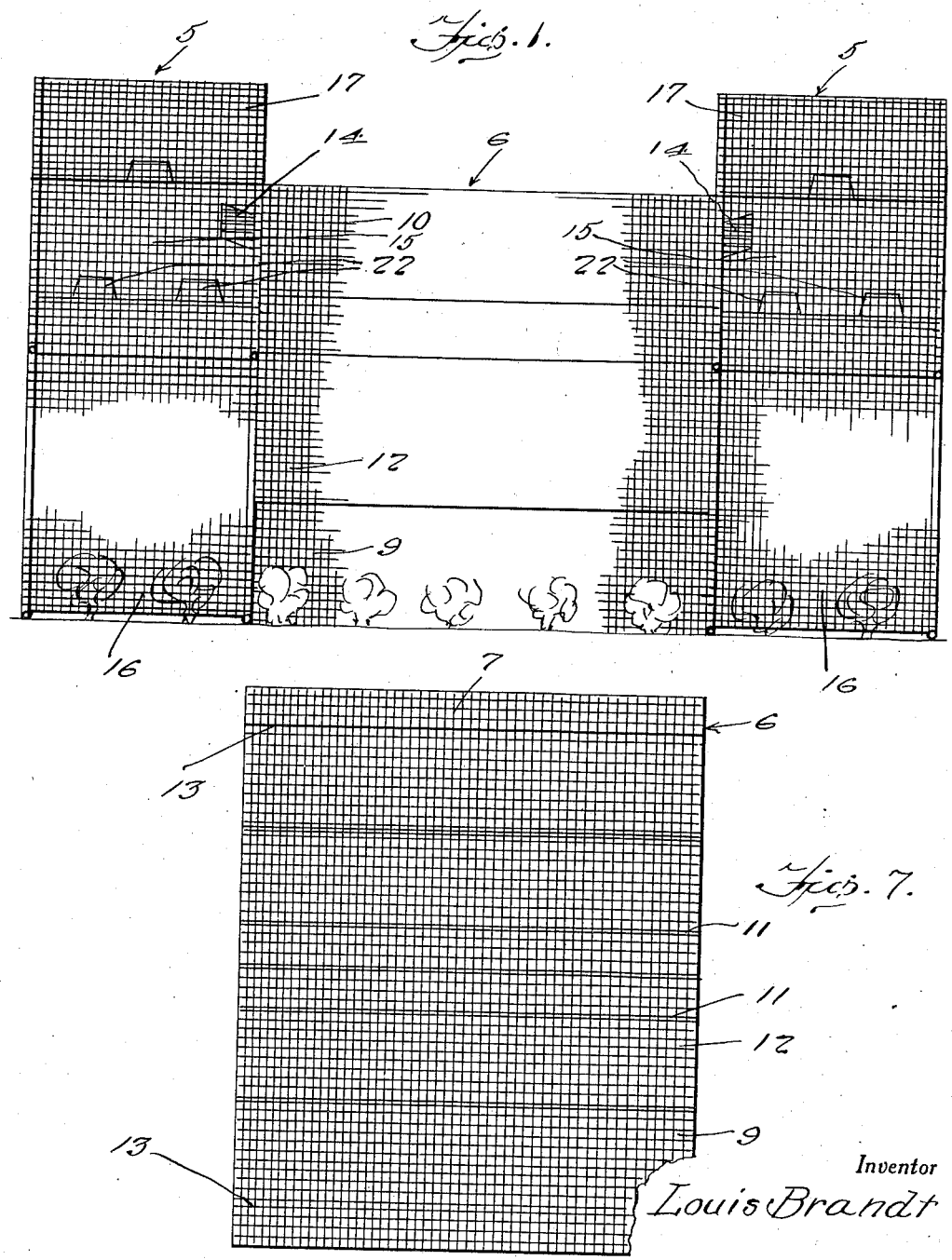
Inventor
Louis Brandt
By Clarence A. O'Brien
and Hyman Berman
Attorneys

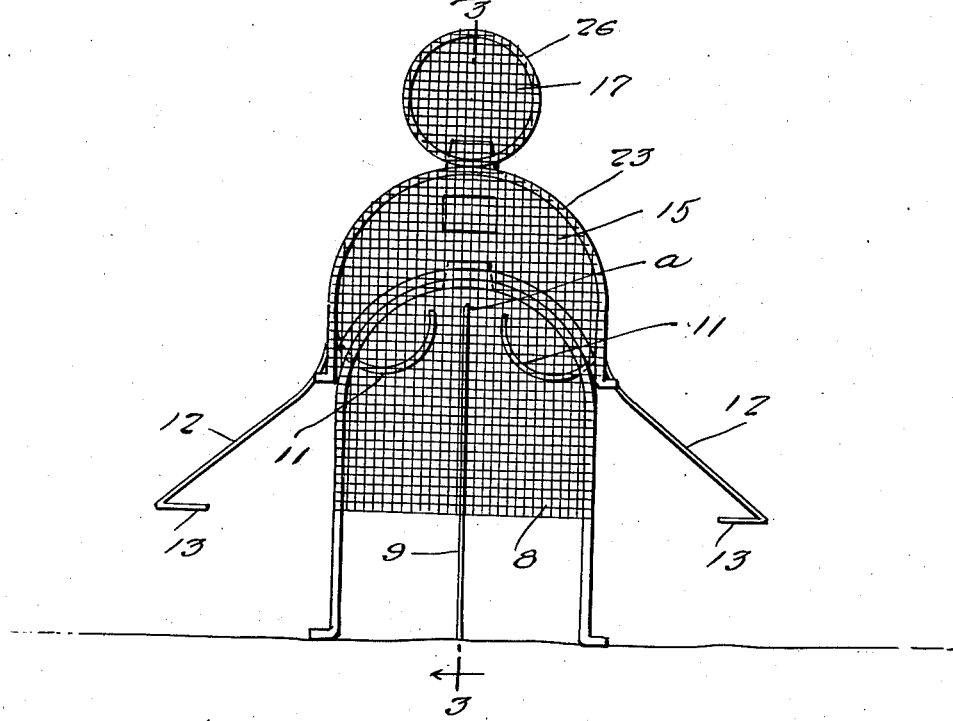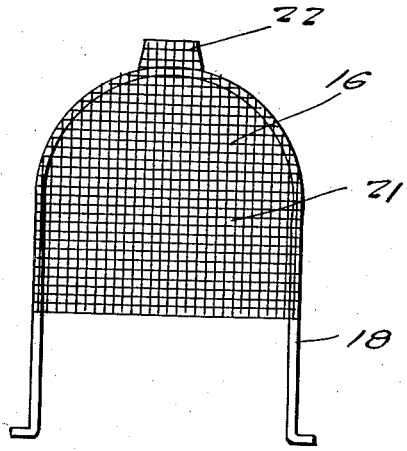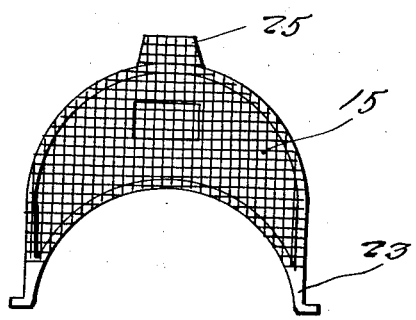

Feb. 13, 1940.  L. BRANDT  2,190,251
CABBAGE MILLER TRAP
Filed Jan. 13, 1939  3 Sheets-Sheet 3

Inventor
Louis Brandt
By Clarence A. O'Brien
and Hyman Berman
Attorneys

Patented Feb. 13, 1940

2,190,251

UNITED STATES PATENT OFFICE 2,190,251

CABBAGE MILLER TRAP

Louis Brandt, Kieler, Wis.

Application January 13, 1939, Serial No. 250,816

3 Claims. (Cl. 43—118)

This invention appertains to new and useful improvements in traps for catching cabbage millers and various other forms of insects which feed on growing crops.

The principal object of the present invention is to provide a trap of sectional construction, and one capable of being taken apart readily or assembled quickly as the need may be.

Another important object of the invention is to provide a set-up structure which will definitely entrap the insects without liklihood that they can escape.

These and other objects and advantages of the invention will become apparent to the reader of the following specification:

In the drawings:

Figure 1 represents a side elevational view of the complete trap.

Figure 2 is an end elevational view.

Figure 5 is an end elevational view of one of the lower sections of one of the end assemblies.

Figure 6 is an end elevational view of the intermediate section of one of the end assemblies.

Figure 7 is a fragmentary side elevational view of the intermediate section.

Figure 3:
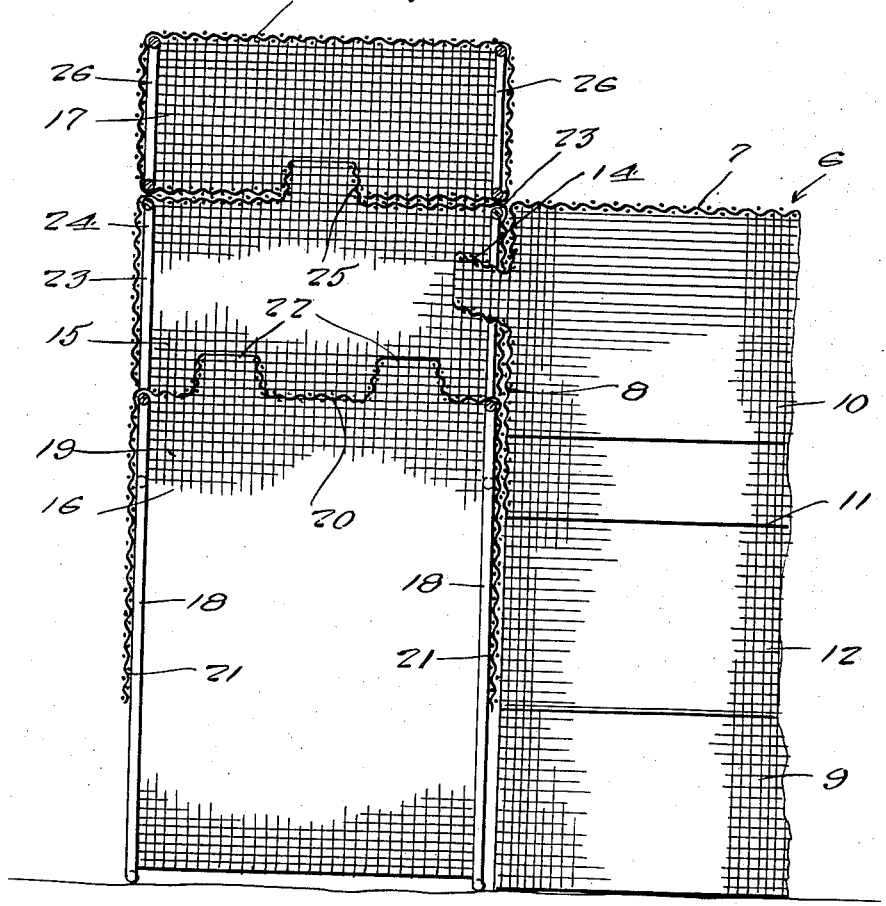
Figure 3 is a fragmentary detailed sectional view taken substantially on line 3—3 of Figure 2.
Figure 4:
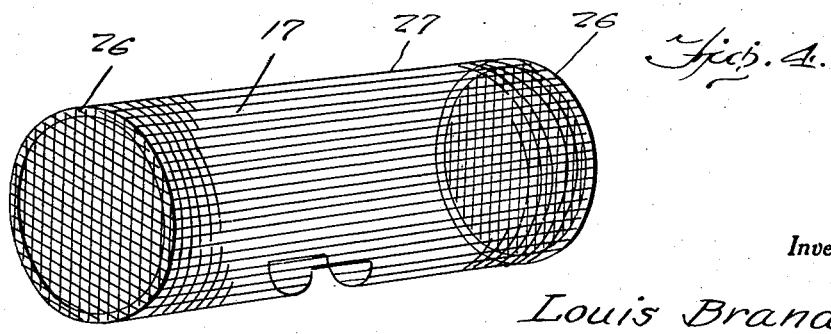
Figure 4 is a perspective view of the uppermost section.

Referring to the drawings wherein like numerals designate like part, it can be seen in Figure 1 that numerals 5—5 generally refer to the end assemblies while numeral 6 generally refers to the intermediate assembly.

The intermediate assembly consists of an intact structure which includes the top wall 7, end walls 8, and the partition 9 which extends vertically midway between the side walls 10. This partition 9 extends upwardly and terminates as at $a$ in close spaced relation to the inwardly extending and arcuate-shaped guide flanges 11—11. It can be seen that the side walls 10 extend downwardly and at the guides 11 flare outwardly to provide inclined portions 12—12 at the opposite sides of the assembly 6, the lower portions of which are bent inwardly as at 13. Thus it can be seen that the insects can walk or fly into the intermediate section 6 and can be guided upwardly toward the outlet nipples 14 by passing through the passageways between the guides 11 and the upper portion of the partition 9.

These nipples 14 are located at the opposite ends of the intermediate section 6 adjacent the upper portion thereof and these nipples fit through the intermediate sections 15 of the end assemblies 5—5. These end assemblies 5—5 each consist of the lower section 16, the intermediate sections 15 and the upper receiving sections 17.

The lower section 16 has the end frame members 18—18, over which is disposed the mesh side walls 19 and the mesh top 20. The mesh end walls 21—21 terminate in spaced relation to the bottom of the section 19 so that insects can also reach the interior of the section 19 from the ground, either from the ground adjacent the end walls 21 or the area under the intermediate section 6.

The nipples 22—22 extend upwardly from the section 19 to release the insects into the intermediate section 15 which is constructed of frame members 23 covered by a mesh sheet 24. The upper portion of the intermediate section 15 has a nipple 25 which fits through the opening in the bottom of the uppermost collection receptacle 17, the latter having the end frame members 26 and the mesh enclosure 27 disposed thereover.

It can be seen that insects travelling upwardly through the intermediate section 6 or through the end sections 16 will pass by way of the nipples 14 or the nipples 22 to the end sections 15 from where, in their attempt to escape, they will pass upwardly into the collection receptacle 17 through the nipple 25.

Obviously, whenever desired these upper collection receptacles 17 can be taken off of the rest of the apparatus which are laid along rows of growing crops and the contents destroyed in any suitable convenient manner.

While the foregoing specification sets forth the invention in specific terms, it is to be understood that numerous changes in the shape, size and materials may be resorted to without departing from the spirit and scope of the invention as claimed hereinafer.

Having described the invention what is claimed as new is:

1. A trap of the character described comprising a pair of end assemblies, said assemblies consisting of a plurality of superimposed receptacles, nipple-like passage forming protrusions between the said superimposed receptacles, an intermediate assembly having insect entrances at the bottom portion thereof and communicating passageways between the intermediate assembly and receptacles of the end assemblies.

2. A trap of the character described comprising a pair of end assemblies, said assemblies consisting of a plurality of superimposed receptacles, nipple-like passage forming protrusions between the said superimposed receptacles, an intermediate assembly having insect entrances at the bottom portion thereof and communicating passageways between the intermediate assembly and receptacles of the end assemblies, said intermediate section provided with a vertically extending partition therein, and a constricted passageway in the upper portion of the intermediate assembly in which the upper portion of the said partition terminates.

3. A trap of the character described comprising a pair of end assemblies, said assemblies consisting of a plurality of superimposed receptacles, nipple-like passage forming protrusions between the said superimposed receptacles, an intermediate assembly having insect entrances at the bottom portion thereof and communicating passageways between the intermediate assembly and receptacles of the end assemblies, said intermediate section provided with a vertically extending partition therein, and a constricted passageway in the upper portion of the intermediate assembly in which the upper portion of the said partition terminates, said intermediate assembly being opened at the lower portions of its sides to define the said entrances, one at each side of the partition.

LOUIS BRANDT.